United States Patent [19]

Day

[11] Patent Number: 4,527,177

[45] Date of Patent: Jul. 2, 1985

[54] ION PROJECTION PRINTER WITH VIRTUAL BACK ELECTRODE

[75] Inventor: Gene F. Day, Cupertino, Calif.

[73] Assignee: Xerox Corporation, Stamford, Conn.

[21] Appl. No.: 527,712

[22] Filed: Aug. 29, 1983

[51] Int. Cl.[3] .............................................. G01D 15/06

[52] U.S. Cl. ...................................................... 346/159

[58] Field of Search ...................... 346/153.1, 155, 159; 361/229, 230

[56] References Cited

U.S. PATENT DOCUMENTS 3,623,123 11/1971 Jvirblis ................................ 346/159

3,979,759 9/1976 Simm .............................. 346/159 X 4,365,549 12/1982 Fotland et al. ................ 346/159 X

FOREIGN PATENT DOCUMENTS 55-55353 4/1980 Japan .

*Primary Examiner*—Thomas H. Tarcza

*Attorney, Agent, or Firm*—Serge Abend

[57] ABSTRACT

An improved ion projection printing apparatus, for imaging on the front surface of a charge receptor sheet with an imagewise charging device and for depositing a counter-charge upon the rear surface of the charge receptor sheet with another charging device concurrently with and spatially opposed to the imagewise charging device.

6 Claims, 10 Drawing Figures

ION PROJECTION PRINTER WITH VIRTUAL BACK ELECTRODE

This invention relates to an improved ion projection printing apparatus, for imaging on the front surface of a charge receptor sheet with an imagewise charging station and for simultaneously depositing a counter-charge directly upon the rear surface of the charge receptor sheet, in the image deposition region, with another charging device.

In U.S. Pat. No. 4,463,363, assigned to the same assignee as the present application entitled "Fluid Jet Assisted Ion Projection System" (Gundlach et al) there is described a high resolution, low cost, ion projection printing system. The application relates to a unique device for the generation of ions of one sign and their subsequent selective deposition, in an image configuration, onto a charge receptor. A jet of transport fluid traverses a channel, passing through the ion generating device, and sweeps the ions past a modulating device for delivering ion "beams" onto a charge receptor sheet, which may be ordinary paper. The paper sheet is held adjacent an electrically biased back electrode, which establishes a strong electric field for accelerating the ions toward the sheet and for focussing the ions thereon. As imaging ions are deposited upon the sheet, a counter-charge is induced in the back electrode for establishing an electrically balanced system. Downstream of the ion projection station, at a developing station, the image charge pattern may be rendered visible by toner particles which are attracted to the surface charge on the sheet and are subsequently fixed to the receptor sheet at a fusing station. Neither the developing or fusing stations are features of the copending application.

In U.S. Pat. No. 3,714,665 (Mutschler et al) entitled "Electrostatic Recording With Improved Electrostatic Charge Retention" there is taught a printing apparatus for recording upon oridinary paper. A charging station, shown schematically by an arrow, which may take the form of any suitable means, is provided for depositing an electrostatic charge pattern upon the paper. A conductive back electrode is positioned in contact with the opposite side of the paper and extends from the charging zone through a development zone, at which location the charge pattern is made visible.

In Japanese Pat. No. 55-55353 (Uchimura) entitled "Electrostatic Printing Device", images are formed on ordinary paper. The described apparatus includes a corona wire ion generator and a modulation structure comprised of two, spaced, conductive, apertured plates. By adjusting the potential difference between the apertured plates, ions are allowed to pass through the apertures or are inhibited from passing. Those ions passing through the modulation structure are then attracted to and accelerated by a back electrode and deposit upon the paper, interposed between the ion source and the back electrode. A development station and fusing station are also incorporated in the printing device. It is the intent of the patented invention to prevent damaging the electrostatic image pattern by eliminating the discharge between the paper and the back electrode prior to development of the image. To this end, the same solution taught in Mutschler et al (described above) is set forth, namely, extending the back electrode through the development station.

It has been found that the back electrode structures taught by Uchimura and by Mutschler et al, if utilized with an ion projection image input device of the type taught by Gundlach et al, are each inadequate to achieve good image quality. While they satisfactorily preserve the latent image prior to development, they do not address the problem of toned image disruption. Thus, as the paper with the toned image thereon separates from the back electrode, before the image is fused, image disruption is likely to occur. The disruption has been observed to take place when the distance between the paper and the back electrode increases to the extent that charge transfer between the back electrode and the back surface of the paper takes place as the Paschen breakdown voltage is exceeded.

Therefore it is a first object of the present invention to provide an ion printing apparatus in which toner image disruption, of the unfused toner particles, is eliminated.

A second object of the present invention to provide an ion printing apparatus in which disruption of the untoned charge image is prevented.

A third object of the present invention to provide an ion printing apparatus in which a larger ion collection voltage may be employed and a larger image charge density obtained than has been heretofore possible with prior art structures.

A fourth object of the present invention to provide an ion printing apparatus in which a wide range and variety of ordinary paper and dielectric films may be employed for image recording.

A fifth object of the present invention to provide an ion printing apparatus in which image receptor flatness and position at the ion imaging station is less critical than in prior art structures.

In a copending patent application bearing U.S. Ser. No. 505,641 filed June 20, 1983, assigned to the same assignee as this application, entitled "Ion Projection Printer With Extended Back Electrode" (Wilcox et al), the first and second objects have been implemented. It teaches that the back electrode may be continuously extended from the image deposition region through the fusing region, for transporting the counter-charge in the back electrode with the image charge on the receptor sheet to a point where toner image disruption may no longer occur.

Similarly, in another copending patent application, bearing U.S. Ser. No. 505,645 filed June 20, 1983, assigned to the same assignee as this application, entitled "Ion Projection Printer With Pseudo-Continuous Back Electrode" (Day) there is taught an improvement on the Wilcox et al invention. In this application, the extended Wilcox et al back electrode is modified to introduce one or more thermal barrier air gaps between the fuser and the image formation and development regions, in order to reduce the flow of heat, through the extended back electrode, from the fusing region back to the image formation and development regions.

The approach followed in the preceding copending applications is to prevent toner image disruption by maintaining the image charge and its counter-charge, in the back electrode, close together through the fusing step.

This invention seeks to prevent both latent and toned image disruption by establishing a charge balanced condition across the sheet itself. It may be carried out, in one form, by providing an ion printing system capable of placing electrostatic charges, in image configuration, upon a relatively moving charge receptor, such as a length of ordinary paper. The system includes in addition to the known ion projection device, the development device, and the fusing device, an ion deposition source, positioned adjacent the image receptor, on the side opposite the ion projection device. The ion deposition source serves to provide a copious supply of counter-ions to the rear surface of the receptor sheet in the image deposition region. Thus, as the rear surface sheet potential is held at or near the "back electrode" voltage by the ion deposition source, and image charge deposition proceeds in the usual way, a charge balanced condition is simultaneously created across the sheet. This serves to effectively eliminate all charge-transfer disruptions which have proved so troublesome with direct imaging on ordinary paper.

A closely related invention is described in a copending patent application filed concurrently herewith, U.S. Ser. No. 527,705 filed on Aug. 29, 1983, entitled "Ion Projection Printer With Charge Compensating Source" (Clark et al). In that application there is disclosed an ion deposition source for depositing a counter-charge directly upon the rear surface of the charge receptor sheet, at a location downstream of the imaging station.

Further features and advantages of this invention will be apparent from the following description considered together with the accompanying drawings wherein.

Figure 4:
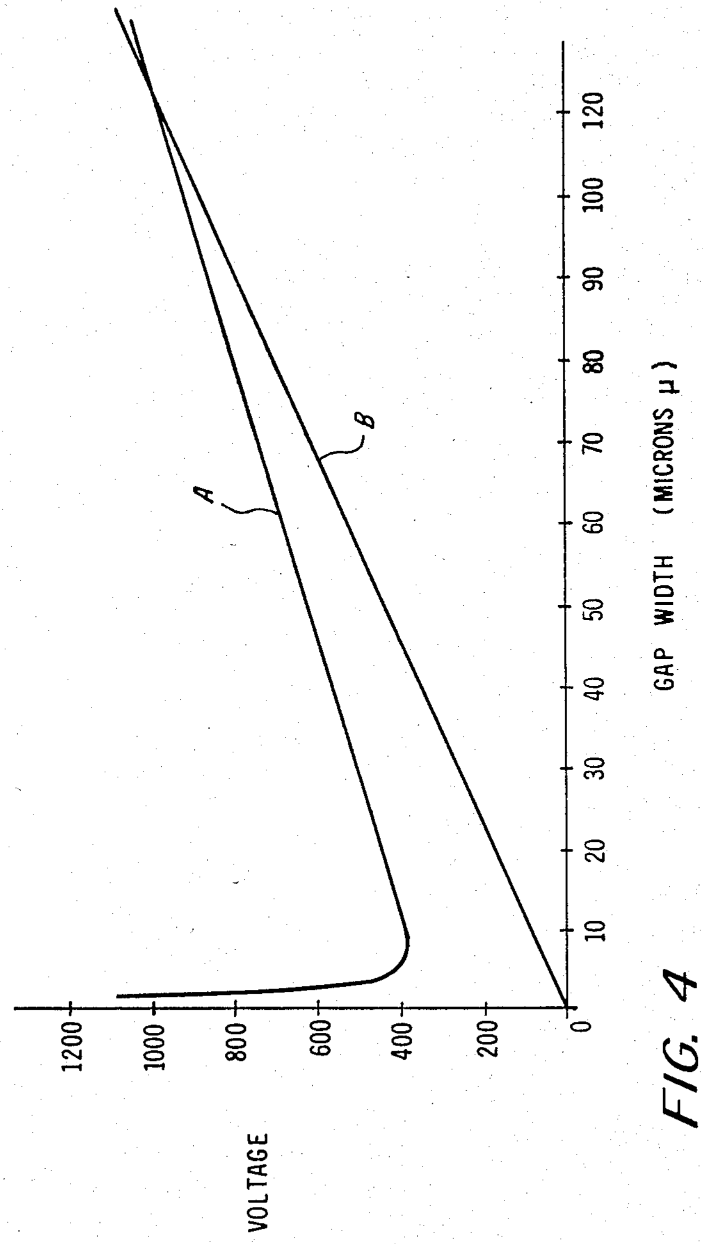
Figure 5:
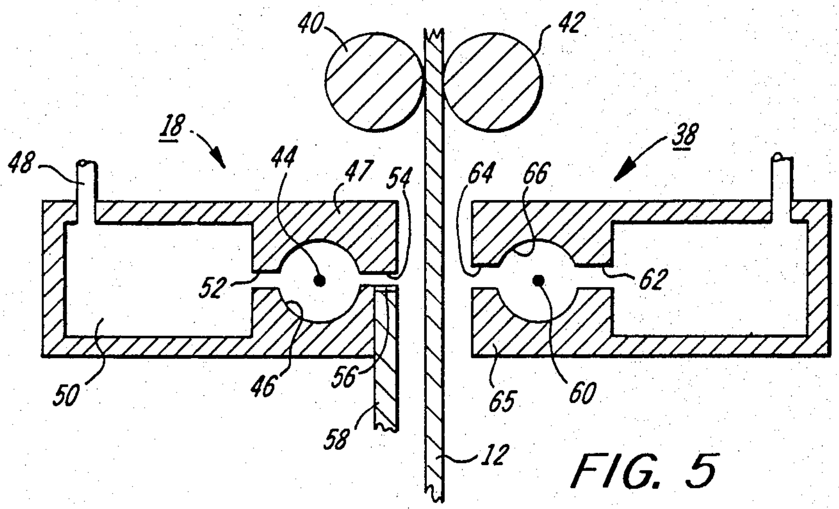
Figure 6:
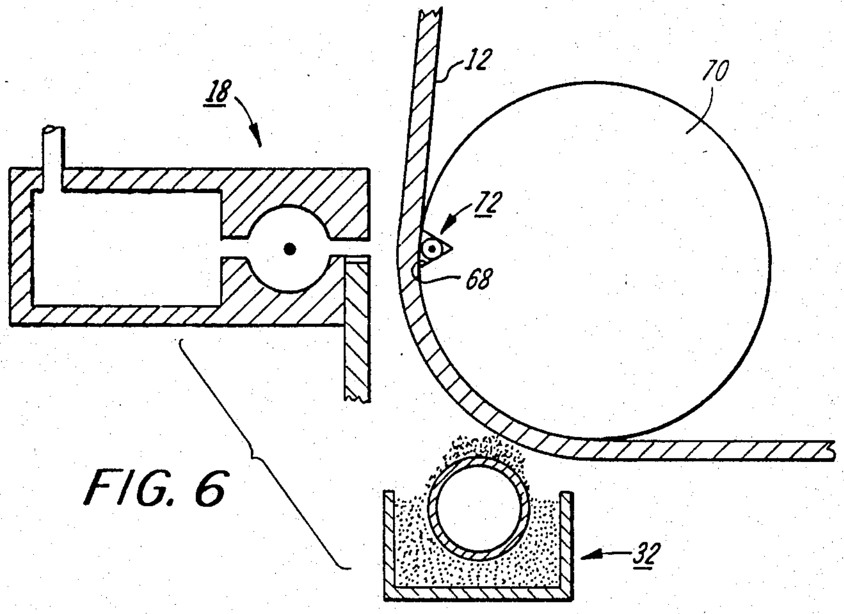
Figure 6A:
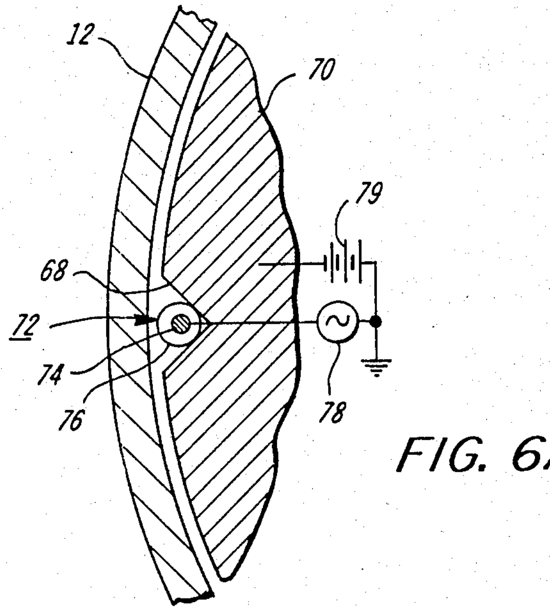
Figure 6B:
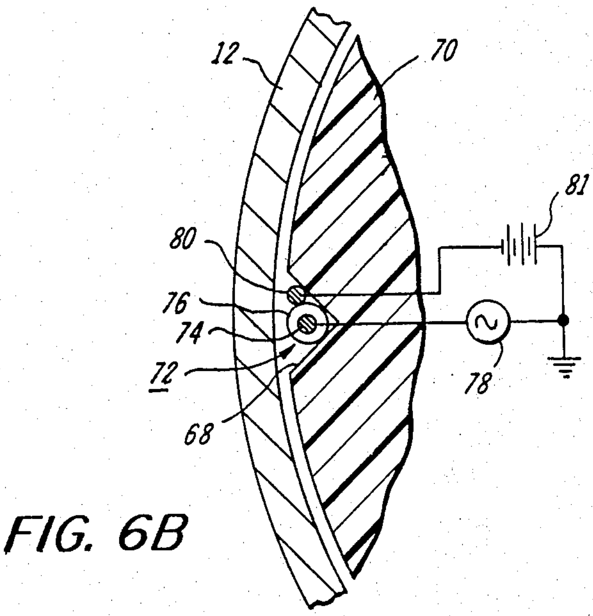
Figure 7:
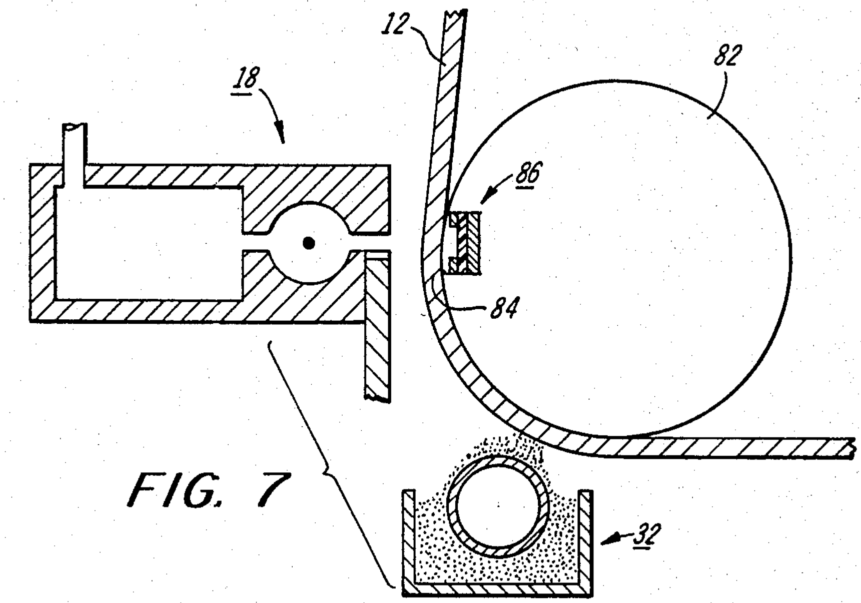
Figure 7A:
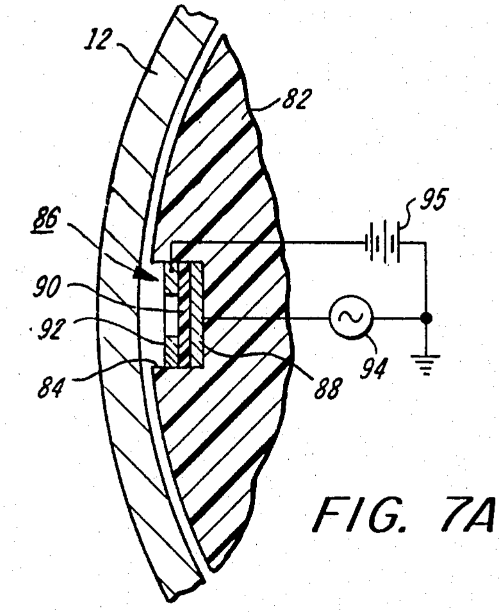

FIG. 4 is a graph showing the Paschen curve for air breakdown together with electric field plots for charge values normally applied to the image receptor paper, FIG. 5 is a side elevation view of one configuration of the charge compensating source located opposite the ion projection imaging region, FIG. 6 is a side elevation view of another configuration of the charge compensating source located opposite the ion projection imaging region, FIG. 6*a* is an enlarged sectional view showing the charge compensating source, of the FIG. 6 embodiment, in greater detail, FIG. 6*b* is an enlarged sectional view similar to FIG. 6*a* illustrating a modification of the charge compensating source of FIG. 6 for being mounted on an insulating support, FIG. 7 is a side elevation view similar to that of FIG. 6, showing yet another configuration of the charge compensating source located opposite the ion projection imaging region, and FIG. 7*a* is an enlarged sectional view showing the charge compensating source, of the FIG. 7 embodiment, in greater detail.

Figure 1:
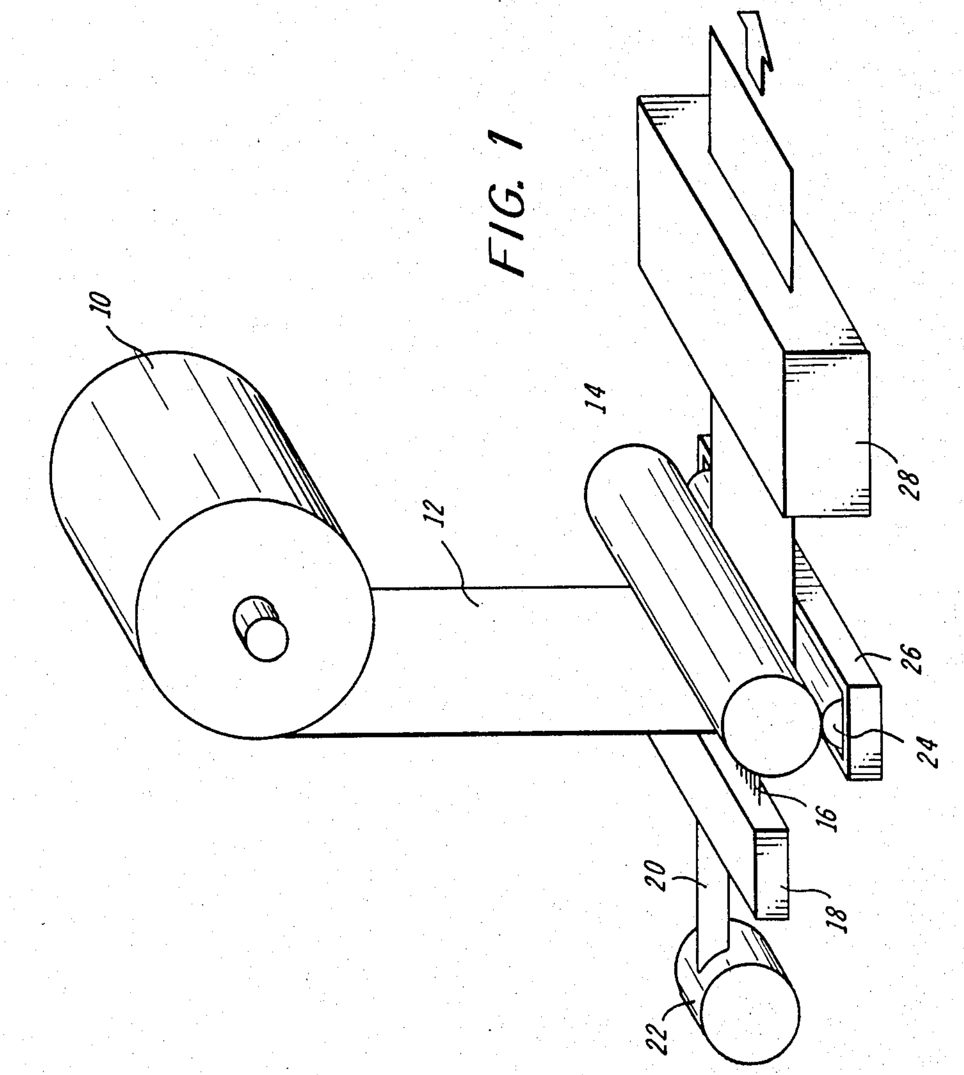
FIG. 1 is a perspective view of an ion projection printing apparatus configured in accordance with the prior art teachings.

With particular reference to the drawings there is illustrated in FIG. 1 an ion projection printing system which does not incorporate the improvement of the present invention. It is presented to show conditions which give rise to toned image disruption problems. A supply roll 10 of a suitable image receptor 12, such as ordinary paper or a dielectric material, delivers the receptor, in intimate contact with the surface of a conductive back electrode 14, to an image receiving zone. An image is formed thereon by the selective projection of beams of ions 16 from the generation and projection head 18. Ions of a desired sign (+ or −) are created within the head and are then transported therethrough by a transport fluid, such as air, delivered by duct 20 from a suitable pump 22. As the ions exit the head, a suitable modulating electrode structure is addressed to allow selected ion beams to pass to the image receptor sheet and to cause other ion beams to be neutralized.

An example of one form of the ion generation and projection head 18 is set forth in copending U.S. patent application Ser. No. 395,170 (Gundlach et al) more fully identified above. Another type of ion generation and projection head is disclosed in a copending U.S. patent application Ser. No. 471,380 filed on Mar. 2, 1983, also assigned to the same assignee as the present application, entitled "Fluid Jet Assisted Ion Projection and Printing Apparatus" (Sheridon).

The latent image is made visible by the application of toner particles to the charge bearing areas of the paper. A typical development apparatus comprises magnetic brush roller 24 rotatable through a sump 26 of magnetic toner particles where it picks up the toner and brushes it over the paper surface. Toner material is selected to achieve a polarity opposite to the image charge so that it will have a preferential attraction for the charged image areas. Once the sheet has been developed it is transported past fuser 28 where the toner is caused to melt and to flow into the paper fibres forming an indelible print of the image.

Figure 2:
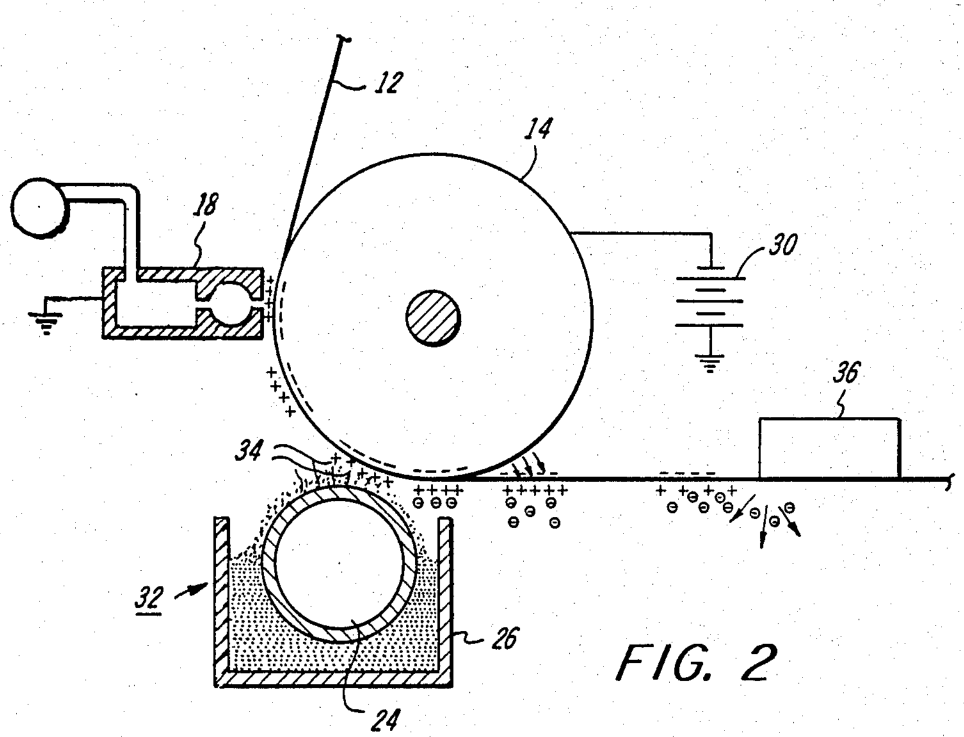
FIG. 2 is a partial side elevation view of the FIG. 1 apparatus showing the areas of image disruption.

In FIG. 2, there is illustrated in more detail, the problem areas encountered in the printing system of FIG. 1. Positive ions exit the ion generation and projection head 18 and deposit, in image configuration, on the front side of the paper 12. The ions are accelerated to the paper and focussed by a field, established between the conductive back electrode 14, connected to a high voltage bias source 30 (on the order of 1300 to 1400 volts DC), and the normally electrically grounded head 18. An image potential is created across the paper thickness by the induction of counter-charges, in the conductive back electrode, at its surface, of a magnitude equal to and of a sign opposite to the image charges. As illustrated, the image charges are positive (+) and the counter-charges are negative (−). It is equally possible to reverse polarities.

Then the paper passes the development station 32 where the image is made visible by a single component magnetic dry toner. Development station 32 comprises a sump or trough 26, within which toner is stored for application by means of a magnetic brush roller 24. At the development zone, adjacent the paper 12, tendrils 34 of linked magnetic toner particles are formed, extending between the roller 24 and the sheet. As these tendrils of toner particles sweep over the surface of the paper a negative charge is induced on the particles and some are attracted to the positive surface charges of the established dipoles and adhere to the paper. Next, the paper is stripped from the back electrode and is drawn past the platen fuser 36 where the toner is heated to its melting point and flows into the paper fibres.

Figure 3:
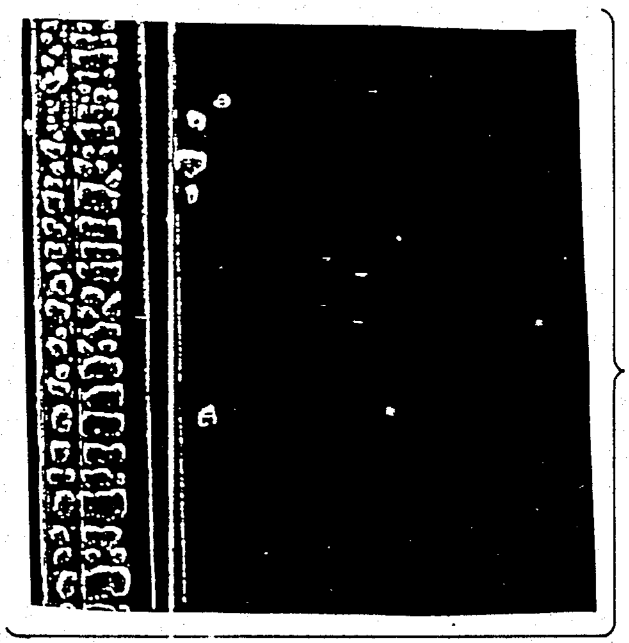
FIG. 3 is a sample of the distorted image of a solidly toned area.

In order to achieve good image quality, it is necessary to maintain intimate contact between the back electrode 14 and the paper 12, in order to keep the image charges very close to their countercharges in the back electrode. However, as the sheet passes from the development station 32 to the fuser 36 it is normally stripped away from the back electrode 14. As the distance of separation increases, the electric field increases, causing the Paschen breakdown voltage to be reached and disruptive charge transfer to occur. During this phenomenon, the negative charges in the back electrode, jump or spark across the gap, to the rear surface of the paper. This is illustrated in FIG. 2 by the wavy arrows in the nip. In areas where there is a high charge density, i.e. large solidly toned areas, as opposed to line images, toner explosions have been observed, leaving very low density spots in the image, as shown in FIG. 3. Although the mechanism of toner exploding off of the paper is not fully understood, it is believed that the phenomenon is the result of mutual repulsion of some of the same polarity toner particles taking place subsequent to the uneven distribution of positive charges on the back surface of the paper, caused by the disruptive charge transfer. The latent image also may be disrupted if the paper is separated from the back electrode, as in paper cockling, and the Paschen breakdown voltage is reached.

If the paper has been separated from the back electrode before the image is fused, an additional area of toner disruption is exhibited as the paper arrives at the leading edge of the electrically conductive heated fuser. The toner particles again repel one another, and can be visually observed to explode in a semi-spherical manner, away from the paper surface (note FIG. 2). A definitive explanation for the disruption is not presently available, however, it is believed that it may be related to the uneven distribution of positive charges on the back surface of the paper, caused by the disruptive charge transfer as the paper was stripped from the back electrode.

When two electrostatic charge bearing surfaces are separated by a gas film, transfer of electrostatic images from one surface to the other requires movement of the electrical charges through the gas. The phenomenon of electrical breakdown of an air gap (disruptive charge transfer) is explained by Paschen's law and may be graphically represented for air by curve A of FIG. 4. Looking at curve A from right to left, it can be seen that as the gap between charge bearing surfaces gets smaller the breakdown voltage decreases and arrives at a minimum of about 360 volts at about 7.5 microns. Thereafter, as the gap gets smaller yet, the breakdown voltage increases because, it is believed, avalanching or sparking becomes less probable in the 2 to 4 micron range.

Typically, the ion generation and projection head 18 of the type illustrated in FIG. 2 is capable of depositing ions having a charge density in the range of about 7 to 8 nanoCoulombs/cm$^2$. A charge density of that magnitude would yield an electric field of about 8 or 9 volts/micron (plotted as curve B in FIG. 4). Thus, as the paper 12 is separated from the back electrode 14 the electric field will increase linearly at the rate of 8 or 9 volts/micron. At a separation of about 125 microns (i.e. about 5 mils) the electric field plot (curve B) crosses the Paschen threshold plot (curve A) and disruptive breakdown will occur.

The foregoing discussion has centered on the problems caused by air breakdown as a charge carrying sheet is separated from its counter-charge in the back electrode. It has been found that if the counter-charge is placed directly upon the rear surface of the receptor sheet, rather than in the conductive back electrode, a balanced condition may exist across the sheet itself and no image charge disruption can occur. To accomplish this result, there is illustrated in FIGS. 5 through 7, a number of variations in the configuration of the rear surface ion deposition source. It should be noted that the ion deposition source is located directly opposite the ion projection imaging station and additionally acts as a "virtual" back electrode for accelerating and focussing the imaging ions on the receptor sheet by holding the rear surface paper potential at or near the "back electrode" voltage.

Turning to FIG. 5, a charge receptor sheet 12, which may be ordinary, untreated paper or even a dielectric film, is moved between an ion projection charging head 18 and an opposing ion deposition source 38. The charging head, in the form set forth in the description of FIGS. 1 and 2, projects writing ion "beams" onto the front surface of the sheet in an imaging charge pattern. Ion deposition source 38 is of a generally similar configuration, modified so as to project a uniform flow of ions, rather than "beams". The sheet 12 is positioned between the two charging heads 18 and 38, and is constrained to move in its desired path, by pairs of rollers 40, 42 or other suitable guiding means. Although only a single pair of rollers is shown (upstream of the charging station), it should be understood that it is necessary to guide the receptor with suitable downstream guiding means. Because the charges on the receptor sheet are largely compensating, and the electric fields associated with the image are largely confined to the interior of the receptor sheet, the downstream guiding means may be made of any desired material, including electrically conductive materials.

The charging head 18 includes a corona wire 44 source of ions, connected to a high potential source (not shown), and centrally disposed in a cylindrical chamber 46 within electrically conductive housing 47 which is maintained at a suitable reference potential. A source of pressurized transport fluid delivers the transport fluid (commonly air) through a supply duct 48 into plenum chamber 50 and then through an entrance channel 52 to the cylindrical chamber 46. As the air passes through the chamber 46 it entrains ions, generated around the corona wire 44, and carries them through an exit channel 54 having modulation electrodes 56 positioned therein, on one wall thereof. The modulation electrodes may be suitably controlled by a driver circuit (not shown), mounted upon a printed circuit board 58, for selectively allowing the individual "beams" of ions to pass to the receptor sheet 12 or for driving them into the opposing conductive head wall, to be neutralized.

The ion deposition source 38 replaces the usual conductive back electrode 14, illustrated in FIGS. 1 and 2. It is similar in construction and operation to the imaging ion projector 18, but has no modulating electrodes since its purpose is to provide a more plentiful supply of counter-ions than the imaging ion projector. To that end, its corona wire 60 is maintained at a sufficiently high, ion generating, potential and its entrance and exit channels 62 and 64 are wider than their corresponding counterparts in the imaging ion projector 18. Its electrically conductive housing 65 is also connected to a suitable reference potential source. Thus, a large enough flow of counter-charge ions is projected so that the space between the ion deposition source 38 and the rear surface of the receptor sheet 12 is filled with counter-charge ions whose source impedence is low enough to be viewed as a very low resistance conductor, maintained substantially at the reference potential. In this way, the ion deposition source 38 acts as a virtual back electrode, serving to provide a collection voltage of sufficient magnitude to establish a field for attracting and focussing imaging ions. Additionally, and more importantly, in terms of preventing all charge transfer disruptions, it provides free counter-ions for depositing directly on the rear surface of the sheet.

It has been found experimentally that the limit on the collection voltage applied to the conductive back electrode is about 1400 to 1500 v D.C. At higher voltages, arcing will occur through the paper to the ion projection head. However, in the present case where a conductive gas comprises the virtual back electrode, such breakdown will not occur. Thus, much higher collection voltages may be applied, resulting in a corresponding increase in the image charge density and substantially easier toning and increased processing latitudes.

Turning to FIGS. 6 and *6a* there is illustrated an alternative configuration of the virtual back electrode ion deposition source. In this embodiment an axially extending V-shaped groove 68, is formed in conductive cylindrical support 70, opposite the imaging station. An elongated ion plasma source 72 is disposed within the groove. Ion source 72 comprises a conductive wire electrode 74, such as tungsten, coated with a dielectric material 76, such as glass. Typically the wire would be about 5 mils in diameter and the overall diameter of the coated wire electrode 72 would be about 9 mils. Other dielectric coatings may be used in place of glass, however, organic insulating materials are generally unsuitable for this application, as most such materials tend to degrade with time due to oxidizing products formed in atmospheric electrical discharges.

An alternating potential source 78 of about 2000 volts peak to peak, operated at a plasma generating frequency, generally in the range of several tens of kHz to one MHz, is applied to the wire 74. The cylindrical support 70 is connected to a D.C. potential source 79 of desired collection voltage, which may be on the order of 1.5 to 3.0 kv.

In operation, the ion deposition source 72 acts as a virtual back electrode, providing an abundant supply of ions of both signs, in a neutral plasma, which fill the groove 68. The plasma is so rich in ions that it looks like a conductive surface at the collection voltage potential of source 79. As the sheet moves past the ion projection head 18, and the raster lines of imaging ions are projected toward the front surface of the sheet, the appropriate ionic counter-charge is attracted from the mix of positive and negative ions in groove 68, to the rear surface of the sheet. The counter-charge compensates for the image charge on the front surface and as the sheet leaves the imaging station, a charge balanced condition exists thereacross.

In FIG. *6b* the cylindrical support 70 is shown to be made of an electrically insulating material. Alternatively, only that portion of the support immediately surrounding the ion deposition source may be made of an insulating material. This approach would allow the high potential elements to be isolated from other elements of the assembly. In such a case, the virtual back electrode will be completed with the addition of conductive wire 80, also placed in groove 68 and connected to a D.C. potential source 81. The potential of the plasma will be that of the wire 80.

Another variation of the ion plasma source is illustrated in FIGS. 7 and *7a*. The cylindrical support structure 82 is made of an insulating material having an axially extending rectangular groove 84 formed therein. As in the FIG. *6b* embodiment, only that portion of the support immediately surrounding the ion deposition source may be made of an insulating material. Embedded within the groove, is a plasma generator 86 which comprises a sandwich structure including a first flat linear conductive foil 88, a dielectric layer 90 and an apertured second flat linear conductive foil 92. Preferably the dielectric layer is mica and the foils are stainless steel. An RF source 94 is applied to the foil 88 and a D.C. potential 95 is connected to the foil 92. A plasma is created in the groove 84 directly opposite the exit channel of the imaging ion projector 18. A copious quantity of ions at substantially the collection voltage potential of source 95 is presented to the rear surface of the sheet 12. Ions of the proper sign (i.e. opposite to the imaging ions) are attracted out of the plasma and are deposited upon the rear surface of the receptor sheet 12 for counterbalancing the imaging charge.

In addition to enabling the sheet to carry both its image charge and its counter-charge so as to be charge balanced, an advantage of the virtual back electrode over the known conductive back electrode is that a higher collection voltage may be used, since the gaseous form of back electrode will not cause breakdown or arcing, as does the conductive metal back electrode. Also, since this imaging process does not rely upon induction of opposite charges in a known conductive backing electrode (such as 14 in FIGS. 1 and 2), the degree of intimacy between the sheet 12 and the backing electrode 14 becomes less important. Similarly, normal cockling and buckling of the sheet as it passes over the backing electrode no longer present a concern and accurate paper positioning at the ion deposition station is less critical than heretofore. Because of the increase in processing latitudes and mechanical tolerances resulting from the virtual back electrode, a wide range of ordinary papers and dielectric films may be employed for recording thereon.

It should be apparent that numerous variations in the configuration of the ion deposition source are possible. It is only necessary to provide a copious supply of ions, of a sign opposite to that of the imaging ions, in the vicinity of the rear surface of the image receptor sheet and to maintain them at the proper collection potential.

What is claimed is:

1. An ion projection printing apparatus for printing on one side of a charge receptor sheet movable in a processing direction and comprising sequentially, in said processing direction, ion projection charging means for delivering imaging ions to said one side of said sheet, development means and fusing means, said charging means and said development means being located on said one side of said receptor sheet, the apparatus being characterized by including stationary support means against which the other side of said receptor sheet is moved, said support means including a groove therein extending transversely to said processing direction, said groove being located opposite said ion projection charging means, and virtual back electrode means, comprising bipolar charge creating means, located within said groove, for continuously delivering a countercharge to the other side of said sheet and for accelerating and focussing said imaging ions.

2. The ion projection printing apparatus as defined in claim 1 characterized in that said bipolar charge creating means comprises a dielectric coated wire and a source of alternating current connected to said wire.

3. The ion projection printing apparatus as defined in claim 2 characterized in that said support means is made of an electrically conductive material and further including a source of reference potential connected thereto.

4. The ion projection printing apparatus as defined in claim 1 characterized in that the portion of said support means within which said groove is located is made of an electrically insulating material.

5. The ion projection printing apparatus as defined in claim 4 characterized in that said bipolar charge creating means comprises a dielectric coated conductive wire and an uncoated conductive wire positioned in said groove, a source of alternating current connected to said coated wire and a source of reference potential connected to said uncoated wire.

6. The ion projection printing apparatus as defined in claim 4 characterized in that said bipolar charge creating means comprises a sandwich structure including a first electrically conductive foil layer, an electrically insulating layer and a second electrically conductive foil layer having apertures therein, said second foil layer being closest to the other side of said receptor sheet, and a source of alternating current connected to said first foil layer, and a source of reference potential connected to said second foil layer.

* * * * *